US012333018B2

(12) United States Patent
Seck et al.

(10) Patent No.: US 12,333,018 B2
(45) Date of Patent: Jun. 17, 2025

(54) SECURITY VULNERABILITY COMMUNICATION AND REMEDIATION WITH MACHINE LEARNING

(71) Applicant: Capital One Services, LLC, McLean, VA (US)

(72) Inventors: Mohamed Seck, Aubrey, TX (US); Krystan R. Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 337 days.

(21) Appl. No.: 17/451,097

(22) Filed: Oct. 15, 2021

(65) Prior Publication Data

US 2023/0120174 A1  Apr. 20, 2023

(51) Int. Cl.
*G06F 21/57* (2013.01)
*G06F 21/55* (2013.01)
(Continued)

(52) U.S. Cl.
CPC ........ *G06F 21/577* (2013.01); *H04L 63/1433* (2013.01); *G06F 21/552* (2013.01);
(Continued)

(58) Field of Classification Search
CPC ... H04L 63/1433; H04L 63/20; H04L 63/205; H04L 63/101; H04L 67/53; H04L 63/1441; G06F 21/577; G06F 2221/033; G06F 2221/034; G06F 21/554; G06F 21/552; G06F 21/566; G06F 11/3604; G06F 21/55; G06F 16/285; G06F 21/00; G06F 11/302;
(Continued)

(56) References Cited

U.S. PATENT DOCUMENTS 9,836,297 B2 * 12/2017 Kotian ....................... G06F 8/71
10,108,432 B1 * 10/2018 Subbiah .............. G06F 9/45512
(Continued)

OTHER PUBLICATIONS

International Search Report and Written Opinion for Application No. PCT/US2022/046565, mailed on Feb. 14, 2023, 10 pages.

*Primary Examiner* — Alexander Lagor
*Assistant Examiner* — Brandon Binczak
(74) *Attorney, Agent, or Firm* — Harrity & Harrity, LLP

(57) ABSTRACT

In some implementations, a remediation device may receive, from a database that stores information regarding security vulnerabilities, security vulnerability indicators associated with one or more cloud-based applications. The remediation device may cluster, using at least one machine learning model, the security vulnerability indicators into classes, and may determine, for each class, a corresponding remediation recommendation. The remediation device may transmit, based on a setting, a corresponding message for each class. The remediation device may receive input associated with at least one of the corresponding messages, and may trigger, for at least one of the classes of security vulnerability indicators and based on the input, an automated remediation script based on a corresponding one of the remediation recommendations. The automated remediation script causes a cloud environment to perform an action for a cloud-based application associated with the security vulnerability indicators in the class(es).

17 Claims, 12 Drawing Sheets

(51) Int. Cl.
*H04L 9/40* (2022.01)
*H04L 67/53* (2022.01)

(52) U.S. Cl.
CPC .. *G06F 2221/033* (2013.01); *G06F 2221/034* (2013.01); *H04L 67/53* (2022.05)

(58) Field of Classification Search
CPC ............................ G06F 11/3034; G06N 20/00; G06Q 10/0635; H04W 12/122; H04W 12/12; G05B 19/0423
See application file for complete search history.

(56) References Cited

U.S. PATENT DOCUMENTS

| | | | |
|---|---|---|---|
| 11,044,256 B1* | 6/2021 | Soby | G06N 5/04 |
| 2003/0217039 A1* | 11/2003 | Kurtz | H04L 63/1408 |
| 2008/0244690 A1 | 10/2008 | Kulkarni et al. | |
| 2013/0117841 A1* | 5/2013 | Iwata | G06F 9/44 726/17 |
| 2013/0167238 A1* | 6/2013 | Russell | H04L 63/1433 726/25 |
| 2016/0248800 A1* | 8/2016 | Ng | G06Q 40/06 |
| 2016/0315961 A1* | 10/2016 | Duer | H04L 63/1433 |
| 2016/0352759 A1 | 12/2016 | Zhai | |
| 2017/0026401 A1 | 1/2017 | Polyakov | |
| 2017/0063912 A1* | 3/2017 | Muddu | G06V 10/225 |
| 2019/0102548 A1* | 4/2019 | Bulut | G06F 21/568 |
| 2019/0342324 A1* | 11/2019 | Nawy | G06F 16/2228 |
| 2020/0296136 A1* | 9/2020 | Liu | H04L 63/02 |
| 2021/0119878 A1* | 4/2021 | Loftus | H04L 41/5025 |
| 2022/0198054 A1* | 6/2022 | Picos | G06F 21/6245 |
| 2022/0222350 A1* | 7/2022 | Franzen | G06F 21/577 |
| 2023/0026385 A1* | 1/2023 | Zhang | G06F 21/577 |

* cited by examiner

SECURITY VULNERABILITY COMMUNICATION AND REMEDIATION WITH MACHINE LEARNING

BACKGROUND

Security vulnerabilities may arise when cloud-based operating systems or other applications are due for security patches or other software updates. Similarly, vulnerabilities may arise when drives or other applications that control, at least in part, networked hardware devices are due for security patches or other software updates. These vulnerabilities can result in downtime if the applications are attacked or if a dependency chain including the applications is broken because the applications are out-of-date.

SUMMARY

Some implementations described herein relate to a system for automated communications and remediation for security vulnerabilities. The system may include one or more memories and one or more processors communicatively coupled to the one or more memories. The one or more processors may be configured to receive, from a database that stores information regarding security vulnerabilities, security vulnerability indicators associated with one or more cloud-based applications. The one or more processors may be further configured to cluster, using at least one similarity between two or more of the security vulnerabilities, the security vulnerability indicators into classes. The one or more processors may be configured to determine, for each class, a corresponding remediation recommendation. The one or more processors may be further configured to transmit, based on a setting and via one or more communication interfaces, a corresponding message for each class. The one or more processors may be configured to receive input associated with at least one of the corresponding messages. The one or more processors may be further configured to trigger, for at least one of the classes of security vulnerability indicators and based on the input, an automated remediation script based on a corresponding one of the remediation recommendations, wherein the automated remediation script causes a cloud environment to perform an action for a cloud-based application associated with the security vulnerability indicators in the at least one of the classes. The one or more processors may be configured to validate that the automated remediation script has resolved the security vulnerabilities associated with the security vulnerability indicators in the at least one of the classes. The one or more processors may be further configured to transmit an indication, based on the validation, that the security vulnerabilities, associated with the security vulnerability indicators in the at least one of the classes, have been resolved.

Some implementations described herein relate to a method of applying machine learning to automated communications and remediation for security vulnerabilities. The method may include receiving, from a database that stores information regarding security vulnerabilities, security vulnerability indicators associated with one or more cloud-based applications. The method may further include clustering, using at least one machine learning model, the security vulnerability indicators into classes. The method may include determining, for each class, a corresponding remediation recommendation. The method may further include transmitting, based on a setting and via one or more communication interfaces, a corresponding message for each class. The method may include receiving input associated with at least one of the corresponding messages. The method may further include triggering, for at least one of the classes of security vulnerability indicators and based on the input, an automated remediation script based on a corresponding one of the remediation recommendations, wherein the automated remediation script causes a cloud environment to perform an action for a cloud-based application associated with the security vulnerability indicators in the at least one of the classes.

Some implementations described herein relate to a non-transitory computer-readable medium that stores a set of instructions for applying machine learning to automated communications and remediation for security vulnerabilities for a device. The set of instructions, when executed by one or more processors of the device, may cause the device to receive, from a database that stores information regarding security vulnerabilities, security vulnerability indicators associated with one or more cloud-based applications. The set of instructions, when executed by one or more processors of the device, may further cause the device to receive historical information associated with the security vulnerability indicators, the historical information including at least environmental information, user information, and remediation information associated with the security vulnerability indicators. The set of instructions, when executed by one or more processors of the device, may cause the device to identify, using at least one machine learning model and the historical information, at least one of the security vulnerabilities. The set of instructions, when executed by one or more processors of the device, may further cause the device to determine, for the at least one of the security vulnerabilities, a corresponding remediation recommendation based on the remediation information associated with the at least one of the security vulnerabilities. The set of instructions, when executed by one or more processors of the device, may further cause the device to generate an automated remediation script based on the corresponding remediation recommendation.

DETAILED DESCRIPTION

Figure 1A:
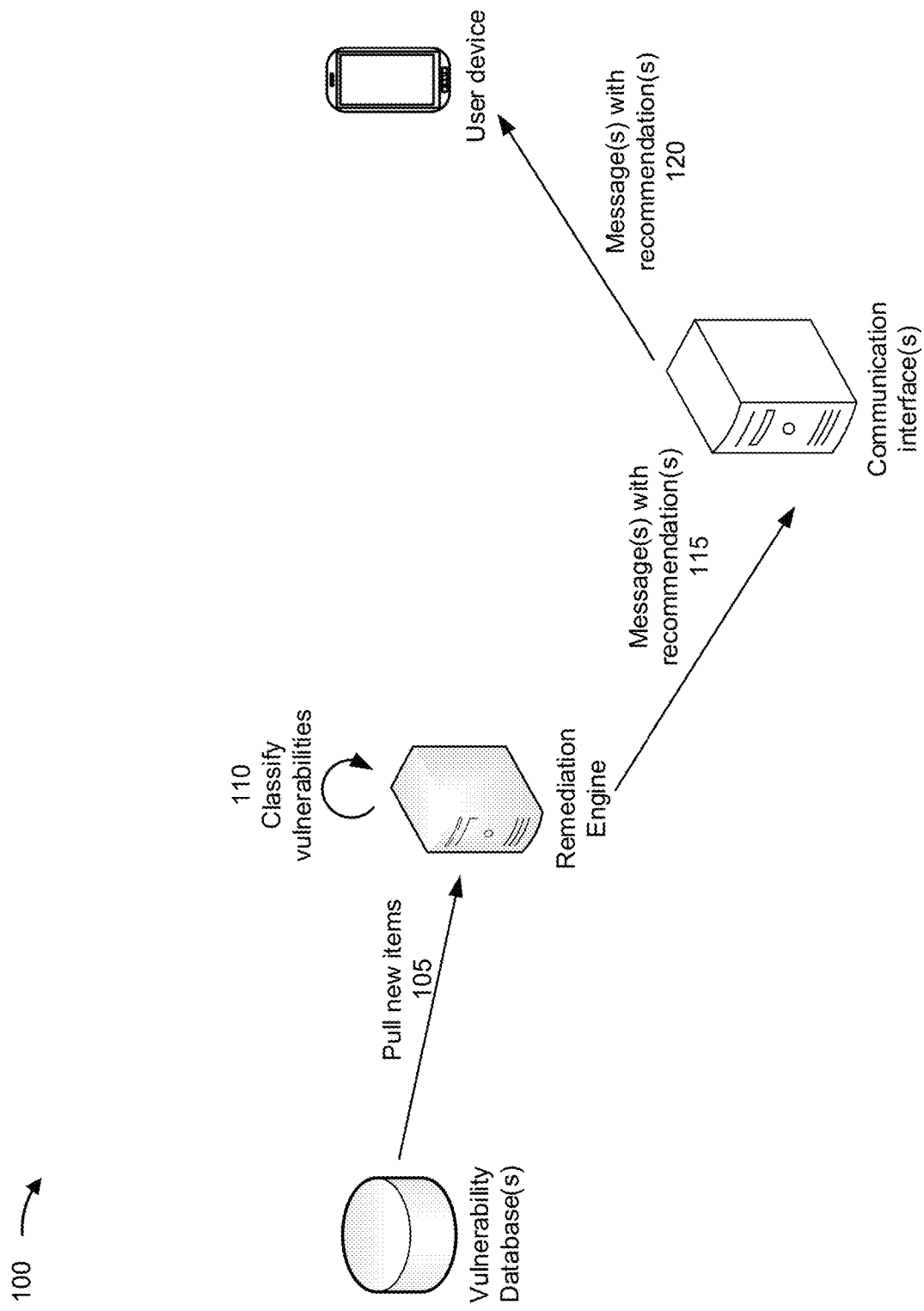
FIGS. 1A-1C are diagrams of an example implementation relating to automated communications and remediation for security vulnerabilities.

The following detailed description of example implementations refers to the accompanying drawings. The same reference numbers in different drawings may identify the same or similar elements.

In some cloud environments, application services (ASVs) or other cloud-based applications may exhibit security vulnerabilities. For example, vulnerabilities may arise when cloud-based operating systems or other applications are due for security patches or other software updates. Similarly, vulnerabilities may arise when drivers or other applications that control networked devices, at least in part, are due for security patches or other software updates.

Technical administrators may collect information regarding vulnerabilities from ASVs. However, these administrators may be required to communicate the vulnerabilities and the properties to users, who can then authorize security patches or other software updates.

Additionally, the administrators generally must trigger communications about the vulnerabilities and the properties to the users. Some automated techniques may generate these communications according to one or more rules. However, generating a communication for each security vulnerability expends significant amounts of power, processing resources, and network resources, and some users are unlikely to engage with frequent communications.

Vulnerabilities can be clustered according to various properties (e.g., associated environments, associate users, and associated hardware, among other examples) in order to reduce a quantity of communications that are transmitted, which improves user experience such that the users are more likely to perform remediation. Some implementations described herein enable a remediation platform to automatically cluster security vulnerabilities into classes and transmit communications for classes rather than individual vulnerabilities, which conserves power, processing resources, and network resources. Additionally, some implementations described herein enable the platform to associate vulnerability indicators with exclusion indicators (e.g., when the vulnerability is associated with a software patch that is forthcoming or associated with a dependency chain such that the vulnerability will be resolved when a different application is updated, among other examples). As a result, the platform conserves additional power, processing resources, and network resources by not indicating the excluded vulnerabilities in the communications.

Furthermore, many remediations are simple, such as authorizing a patch or other software update. Performing these remediations automatically reduces delays between detection of the vulnerabilities and the properties and corresponding remediation procedures, thereby improving security within a corresponding cloud environment. Some implementations described herein enable automated remediation of vulnerable cloud-based applications. As a result, the cloud environment is more secure.

Some implementations described herein enable a machine learning model to identify vulnerabilities associated with complicated remediations. For example, the model may use historical information associated with the security vulnerabilities to identify vulnerabilities likely to cause downtime for large quantities of users and/or a large amount of time, among other examples.

Figure 1B:
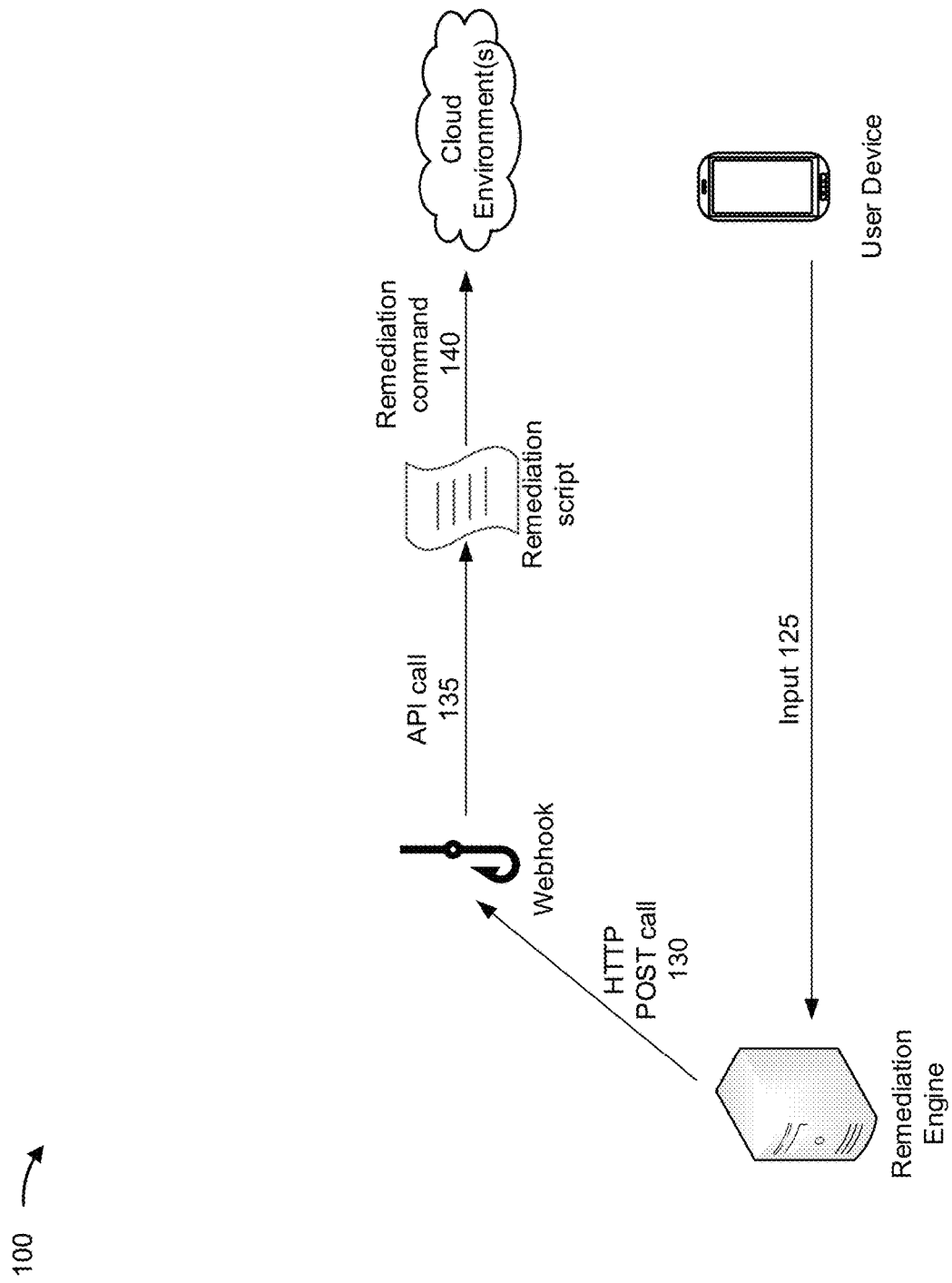
Figure 1C:
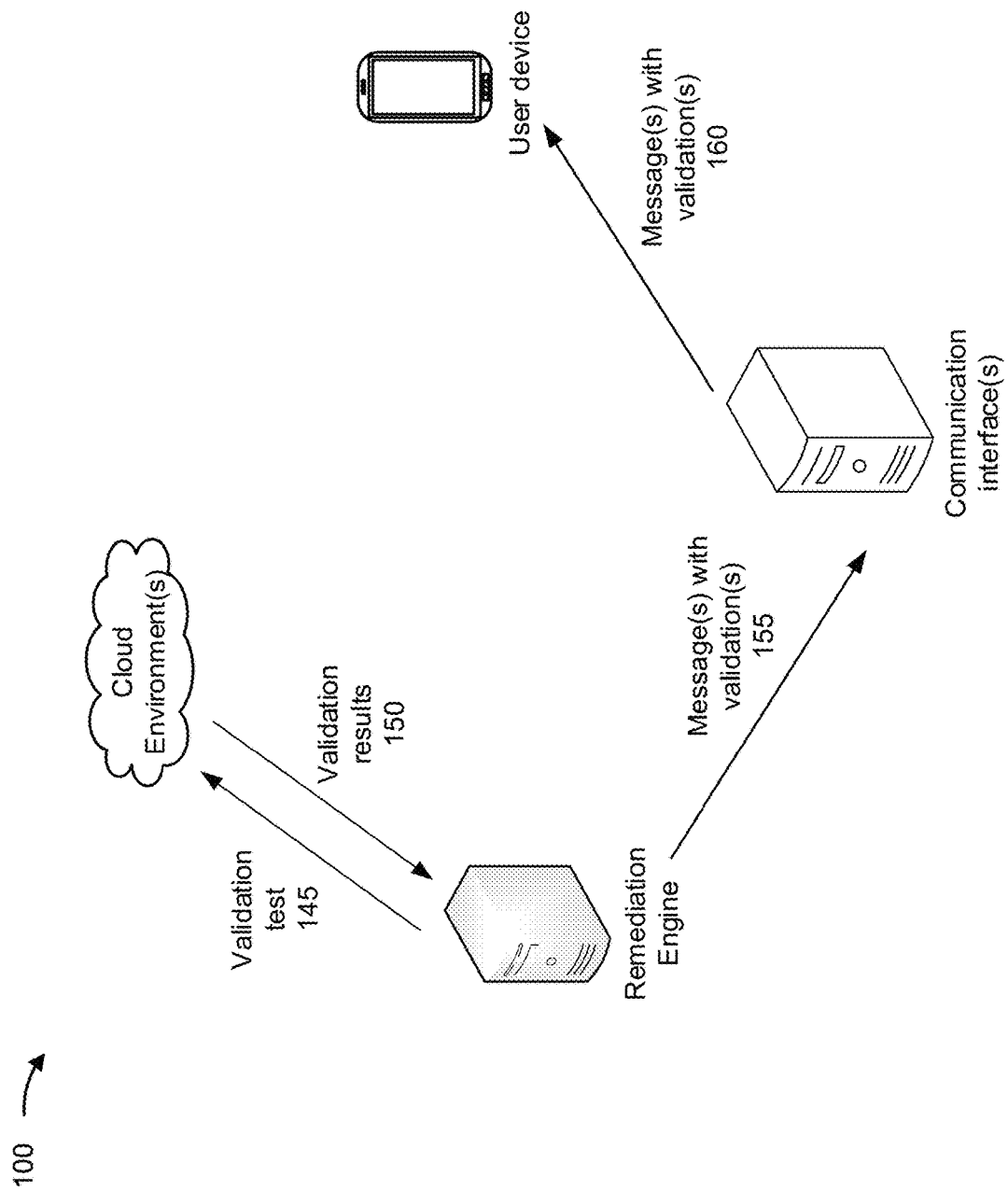

FIGS. 1A-1C are diagrams of an example 100 associated with automated communications and remediation for security vulnerabilities. As shown in FIGS. 1A-1C, example 100 includes vulnerability databases (e.g., one or more vulnerability databases), cloud environments (e.g., one or more cloud environments), a remediation engine, a user device, and communication interfaces (e.g., one or more communication interfaces). These devices are described in more detail in connection with FIGS. 4 and 5.

As shown by reference number 105, the remediation engine may receive, from the vulnerability databases, security vulnerability indicators associated with one or more cloud-based applications. For example, the vulnerability databases may store information regarding security vulnerabilities and may include an on-site database and/or a remote database storing the information. In some implementations, the databases may be relational, such that the security vulnerability indicators are stored in association (e.g., via rows and/or columns) with identifiers of the cloud-based applications. As another example, the databases may be graphical, such that nodes representing the cloud-based applications are connected (e.g., via edges) to nodes representing the security vulnerability indicators. In some implementations, the databases that store information regarding security vulnerabilities may receive the information automatically (e.g., as output from one or more ASVs) and/or manually (e.g., entered by one or more administrators associated with the cloud-based applications).

The cloud-based applications may include applications executed on one or more servers to provide services for end users (e.g., software as a service (SaaS), infrastructure as a service (IaaS), platform as a service (PaaS), desktop as a service (DaaS), managed software as a service (MSaaS), mobile backend as a service (MBaaS), datacenter as a service (DCaaS), or information technology management as a service (ITMaaS), among other examples). Additionally, or alternatively, the cloud-based applications may include drivers or other applications that control, at least in part, networked hardware devices (e.g., employee laptops, company printers, or automated teller machines (ATMs), among other examples).

As shown in FIG. 1A, the remediation engine may pull the security vulnerability indicators from the databases (e.g., using a pull request and/or another request for information from the databases). Additionally, or alternatively, the databases may push the security vulnerability indicators to the remediation engine (e.g., using a push command or a scheduled transmission, among other examples).

In some implementations, the security vulnerability indicators may indicate a required patch and/or other software update, a missing firewall or other network security software, missing anti-virus and/or other anti-malware software, subpar encryption keys and/or other encryption protocols, out-of-date hardware drivers, and/or other vulnerabilities associated with the cloud-based applications.

As shown by reference number 110, the remediation engine may cluster the security vulnerability indicators into classes. For example, the remediation engine may determine similarities (e.g., at least one similarity) between multiple (e.g., two or more) indicators of the security vulnerabilities. The similarities may include being on a same cloud environment (e.g., a same cloud instance or instances providing the same functions, among other examples), a same hardware server, or associated with a same (or at least partially overlapping) set of users. Accordingly, the remediation engine may determine that a software patch or other remediation can be applied to the class rather than individually for each security vulnerability indicator in the class. For example, the remediation engine may determine that application of the software patch or other remediation to the cloud environment will apply to all application instances within the environment, each of which may be associated with a different security vulnerability indicator. Accordingly, the remediation engine may group the security vulnerabilities associated with that cloud environment into one class. Similarly, the remediation engine may determine that application of the software patch or other remediation to the hardware server will apply to all cloud instances executed on the server, each of which may be associated with different security vulnerability indicators. Accordingly, the remediation engine may group the security vulnerabilities associated with that hardware server into one class.

Additionally, alternatively, the remediation engine may determine that the same set of users (or at least one overlapping user) administers different cloud-based applications. Accordingly, the remediation engine may determine that security vulnerabilities, associated with that set of users, may be remedied with approval by the same set of users and may therefore group those security vulnerabilities into one class.

In some implementations, the remediation engine may cluster the security vulnerability indicators by applying a plurality of regular expressions (regexes) to fields (e.g., one or more fields) included in the security vulnerability indicators. For example, the fields may indicate the cloud-based application, cloud environments, hardware servers, users, and/or other properties associated with the security vulnerabilities. Accordingly, the remediation engine may apply the regexes to identify overlapping fields between the security vulnerability indicators, and cluster the security vulnerability indicators accordingly.

In some implementations, the remediation engine may apply a unique identifier (e.g., a unique integer ID, a unique alphanumeric ID, or another unique ID) to each class. Accordingly, when a new security vulnerability indicator is received from the vulnerability databases, the remediation engine may use a same model (e.g., using the same factors described above) to determine whether an existing identifier, associated with an existing class of vulnerabilities, should be applied to the new security vulnerability indicator. Accordingly, the remediation engine may map corresponding identifiers associated with the security vulnerability indicators to corresponding unique identifiers associated with the classes.

In some implementations, the remediation engine may cluster the security vulnerabilities using a machine learning model (e.g., at least one machine learning model). For example, the model may be trained and applied similarly as described with respect to FIGS. 3A-3B in order to cluster the security vulnerabilities. The machine learning model may be trained using the same factors described above. In some implementations, the machine learning model may use at least server indications associated with the security vulnerability indicators and application indications associated with the security vulnerability indicators to cluster the security vulnerability indicators. For example, the machine learning model may group security vulnerability indicators associated with a same server together into a class, but distinguish security vulnerability indicators associated with different cloud-based applications into different classes.

The remediation engine may further exclude a security vulnerability indicator (e.g., at least one of the security vulnerability indicators) from classification based on an exclusion indicator (e.g., at least one exclusion indicator) associated with the excluded security vulnerability indicator. For example, the remediation engine may determine that the security vulnerability indicator is associated with a software patch or other update that is forthcoming. Accordingly, the remediation engine may determine that the security vulnerability indicator cannot be resolved currently and therefore exclude the security vulnerability indicator from the clustering described above. Additionally, or alternatively, the remediation engine may receive the exclusion indicator with the security vulnerability indicator from the vulnerability databases. For example, the databases may receive the exclusion indicator automatically (e.g., as output from one or more ASVs) and/or manually (e.g., entered by one or more administrators associated with the cloud-based applications).

By excluding some security vulnerability indicators, the remediation engine conserves power and processing resources that would otherwise be consumed in clustering the excluded security vulnerability indicators. Additionally, the remediation engine may not indicate the excluded security vulnerability indicators in the corresponding messages (e.g., as described in connection with reference numbers 115 and 120), which further conserves power, processing resources, and networking resources that would otherwise be consumed in generating and transmitting corresponding messages for the excluded security vulnerability indicators.

Additionally, the remediation engine may determine, for each class, a corresponding remediation recommendation. For example, the remediation engine may use a lookup table and/or another algorithm to determine the corresponding remediation recommendations. In some implementations, the remediation engine may determine the corresponding remediation recommendation based on output from a remediation engine. The remediation engine may be a trained machine learning model (e.g., trained and applied similarly as described with respect to FIGS. 3A-3B).

In some implementations, the corresponding remediation recommendations may indicate a recommended patch and/or other software update to authorize, a recommended firewall or other network security software to install or activate, a recommended anti-virus and/or other anti-malware software to deploy, a recommended encryption key and/or other encryption protocol to use, a recommended update to a hardware driver, and/or other recommendations to remediate the corresponding security vulnerabilities.

As shown by reference number 115, the remediation engine may transmit, based on a user setting and via the communication interfaces, a corresponding message for each class. Because the security vulnerability indicators are clustered into classes, the remediation engine conserves power and processing resources when generating the corresponding messages by class rather than by individual security vulnerability indicators. Additionally, the remediation engine conserves network resources by reducing a quantity of transmissions to the communication interfaces.

In some implementations, the remediation engine may determine, based on the user setting, the communication interfaces, and communicate with one or more servers associated with the communication interfaces to transmit the corresponding message to the user. For example, a stored setting associated with one user who is associated with one cloud-based application may indicate a first communication interface (e.g., a particular email, chat service, phone number, and/or other interface) to use to send corresponding messages for classes of security vulnerability indicators associated with that cloud-based application. However, a different stored setting associated with another user who is associated with a different cloud-based application may indicate a second communication interface (e.g., a particular email, chat service, phone number, and/or other interface) to use to send corresponding messages for classes of security vulnerability indicators associated with that cloud-based application. Additionally, or alternatively, the remediation engine may determine, based on the user setting, a schedule, and transmit the corresponding message according to the schedule. For example, a stored setting associated with one user who is associated with one cloud-based application may indicate a first schedule to use to send corresponding messages (e.g., how often (e.g., based on a periodicity and/or proximity to corresponding due dates) and/or how many corresponding messages) for classes of security vulnerability indicators associated with that cloud-based application. However, a different stored setting associated with another user who is associated with a different cloud-based application may indicate a second schedule to use to send corresponding messages (e.g., how many corresponding messages and/or how often) for classes of security vulnerability indicators associated with that cloud-based application.

As shown by reference number 120, the communication interfaces may forward the corresponding messages to user devices associated with users that are responsible for the cloud-based applications. For example, the remediation engine may use a lookup table and/or another algorithm to determine the users and may indicate, to the communication interfaces, the users to whom the corresponding messages should be sent. Because the security vulnerability indicators are clustered into classes, the communication interfaces conserve network resources by reducing a quantity of transmissions to the user devices.

As shown in FIG. 1B and by reference number 125, the remediation engine may receive input associated with a corresponding message (e.g., at least one of the corresponding messages). In some implementations, the input may be based on interaction (e.g., from a user through a user device associated with the user) with at least a portion of the corresponding message. For example, a user may click, tap, or otherwise interact with the corresponding message in order to transmit input to the remediation engine. In some implementations, the input includes selection of a hyperlink (e.g., a hypertext transfer protocol (HTTP) hyperlink) included in the corresponding message.

In some implementations, the remediation engine may receive, with the input, a credential (e.g., at least one credential) associated with a recipient (e.g., at least one recipient) of the corresponding message. For example, the user may provide a username and password, provide a passcode, provide a personal identification number (PIN), perform a two-factor authorization process, authorize a single sign-on (SSO) authentication exchange, or otherwise indicate to the remediation engine that the input is associated with the credential.

As shown by reference numbers 130 and 135, the remediation engine may trigger, for a class of security vulnerability indicators (e.g., at least one of the classes of security vulnerability indicators), an automated remediation script based on a corresponding remediation recommendation (e.g., a corresponding one of the remediation recommendations described above). For example, as shown by reference number 130, the remediation engine may transmit an HTTP POST call to a webhook based on the corresponding remediation recommendation. In some implementations, the webhook may be configured based on a user setting. Accordingly, as shown by reference number 135, the webhook may call an application programming interface (API) to trigger the automated remediation script.

In some implementations, the automated remediation script is triggered based on the input. Additionally, the automated remediation script may be triggered by the credential provided with the input, as described above.

As shown by reference number 140, the automated remediation script may instruct a cloud environment to perform an action for a cloud-based application associated with the security vulnerability indicators in the class. For example, the automated remediation script may trigger a patch and/or other software update to the cloud-based application.

As shown in FIG. 1C and by reference numbers 145 and 150, the remediation engine may validate that the automated remediation script has resolved the security vulnerabilities associated with the security vulnerability indicators in the class. For example, as shown by reference number 145, the remediation engine may send commands (e.g., one or more commands) to the cloud environments in order to verify functionalities of the cloud-based application associated with the security vulnerability indicators in the class. Accordingly, as shown by reference number 150, the remediation engine may receive a report regarding (or other information indicating the results of) the commands. Based on the results, the remediation engine may verify that the automated remediation script resolved the security vulnerabilities associated with the security vulnerability indicators in the class.

As shown by reference number 155, the remediation engine may transmit, via the communication interfaces, an indication that the security vulnerabilities, associated with the security vulnerability indicators in the class, have been resolved. For example, the remediation engine may generate the indication based on the validation described in connection with reference numbers 145 and 150. Additionally, the remediation engine may apply a user setting, as described above with respect to the communications, to determine when and how to transmit the indication.

As shown by reference number 160, the communication interfaces may forward the indication to a user device (e.g., one or more user devices) associated with a user (e.g., one or more users) that is responsible for the cloud-based application associated with the security vulnerability indicators in the class. For example, the remediation engine may use a lookup table and/or another algorithm to determine the user and may indicate, to the communication interfaces, the user to whom the indication should be sent.

By using techniques as described above, the remediation engine can cluster security vulnerability indicators to reduce communications that are transmitted to users regarding the security vulnerability indicators. As a result, the user experience is improved with more relevant and accurate communications than provided by existing techniques. Additionally, the remediation engine conserves power, processing resources, and network resources consumed in generating and transmitting the communications. In some implementations and as described above, the remediation engine may also provide automated remediation for at least some security vulnerabilities. Accordingly, the remediation engine increases speed and efficiency of remediation procedures, resulting in more secure cloud environments.

As indicated above, FIGS. 1A-1C are provided as an example. Other examples may differ from what is described with regard to FIGS. 1A-1C.

Figure 2A:
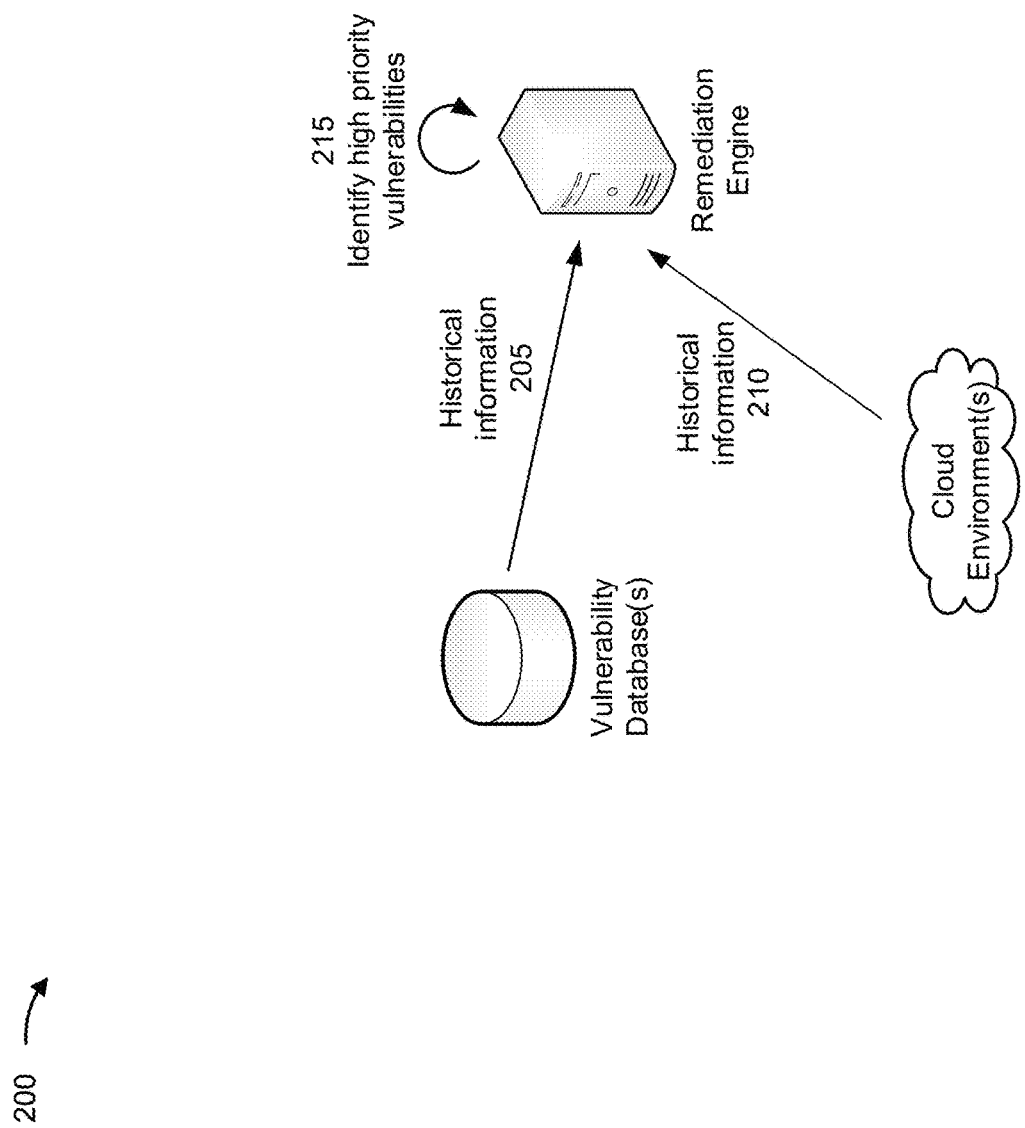
FIGS. 2A-2C are diagrams of an example implementation relating to applying machine learning to automated communications and remediation for security vulnerabilities.
Figure 2B:
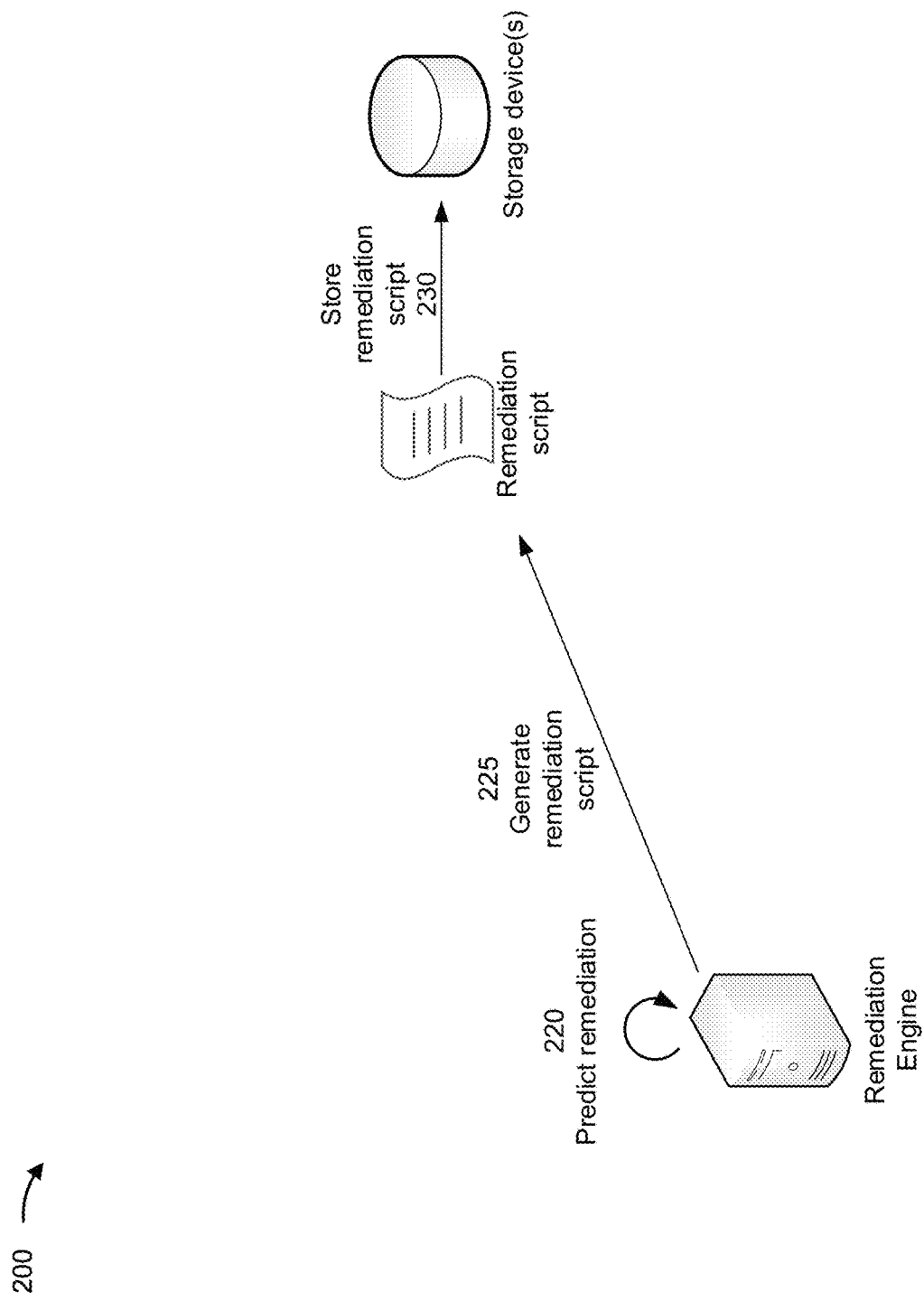
Figure 2C:
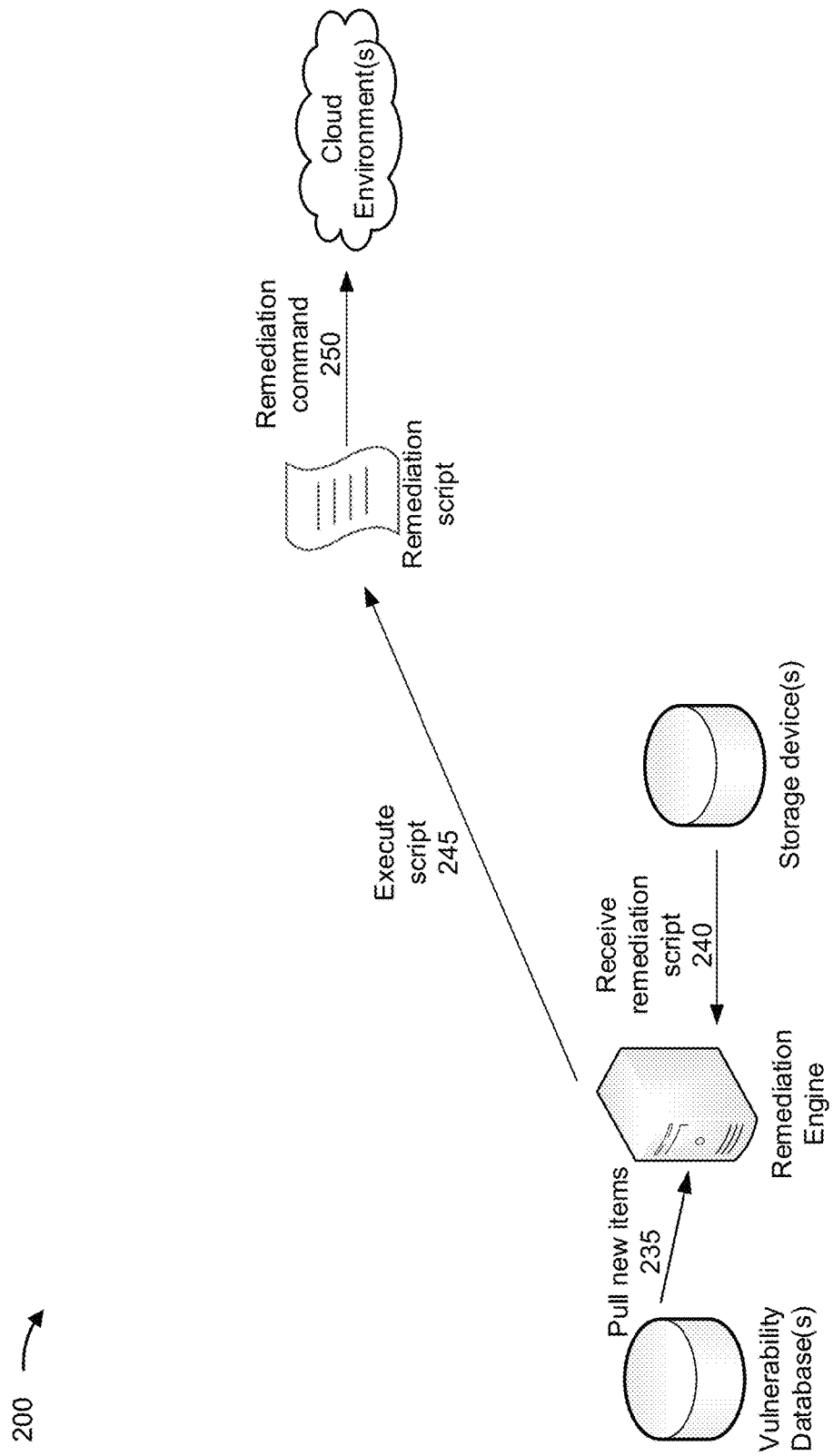

FIGS. 2A-2C are diagrams of an example 200 associated with applying machine learning to automated communications and remediation for security vulnerabilities. As shown in FIGS. 2A-2C, example 200 includes one or more vulnerability databases, one or more cloud environments, a remediation engine, a user device, and one or more storage devices. These devices are described in more detail in connection with FIGS. 4 and 5.

In some implementations, similarly as described with respect to example 100, the remediation engine may receive, from the vulnerability databases, security vulnerability indicators associated with one or more cloud-based applications.

Additionally, as shown by reference numbers 205 and 210, the remediation engine may receive historical information associated with the security vulnerability indicators. The historical information may include at least environmental information (e.g., indicating cloud environments associated with the security vulnerabilities), user information (e.g., indicating users responsible for the cloud-based applications associated with the security vulnerabilities), and remediation information (e.g., a sequence of commands or other steps performed in the cloud-based environments to try to remedy the security vulnerabilities) associated with the security vulnerability indicators. As shown by reference number 205, the remediation engine may receive the historical information from the vulnerability databases. As shown by reference number 210, the remediation engine may additionally or alternatively receive the historical information from the cloud environments associated with the cloud-based applications. In some implementations, the remediation engine may pull the historical information (e.g., using a pull request and/or another request for information). Additionally, or alternatively, the databases and/or the environments may push the historical information to the remediation engine (e.g., using a push command or a scheduled transmission, among other examples).

As shown by reference number 215, the remediation engine may identify, using a machine learning model (e.g., at least one machine learning model as described in connection with FIGS. 3A-3B) and the historical information, a security vulnerability (e.g., at least one of the security vulnerabilities). As shown in FIG. 2A, the remediation engine may identify the security vulnerability as high priority. For example, as described in connection with FIGS. 3A-3B, the remediation engine may use the machine learning model to identify the security vulnerability based on determining that a quantity of affected users associated with the security vulnerability satisfies a user quantity threshold. Additionally, or alternatively, and as described in connection with FIGS. 3A-3B, the remediation engine may use the machine learning model to identify the security vulnerability based on determining that an amount of remediation time associated with the security vulnerability satisfies a time threshold.

The remediation engine may further exclude a security vulnerability indicator (e.g., at least one of the security vulnerability indicators) from the machine learning model based on an exclusion indicator (e.g., at least one exclusion indicator) associated with the excluded security vulnerability indicator (e.g., as described in connection with FIG. 1A). By excluding some security vulnerability indicators, the remediation engine conserves power and processing resources that would otherwise be consumed in training and/or applying the machine learning model. Additionally, the remediation engine may not attempt to predict remediation recommendations for the excluded security vulnerability indicators in the corresponding messages (e.g., as described in connection with reference number 220), which further conserves power and processing resources that would otherwise be consumed in attempting to determine remediation recommendations for the excluded security vulnerability indicators.

As shown in FIG. 2B and by reference number 220, the remediation engine may determine, for the identified security vulnerability, a corresponding remediation recommendation based on the remediation information. For example, the remediation engine may apply a machine learning model (e.g., at least one machine learning model as described in connection with FIGS. 3A-3B) to at least a portion of the historical information in order to predict a remediation recommendation for the identified security vulnerability (e.g., the high priority security vulnerability). For example, the remediation engine may use the machine learning model to determine the corresponding remediation recommendation based on other security vulnerabilities (e.g., one or more others of the security vulnerabilities) that are associated with a same server as the identified security vulnerability. Additionally, or alternatively, the remediation engine may use the machine learning model to determine the corresponding remediation recommendation based on other security vulnerabilities that are associated with a same cloud-based application as the identified security vulnerability.

Accordingly, as shown by reference number 225, the remediation engine may generate an automated remediation script based on the corresponding remediation recommendation. For example, the remediation engine may identify, within the remediation information, a plurality of commands provided to a cloud environment. For example, the commands may be associated with a cloud environment for a cloud-based application associated with the identified security vulnerability indicator, such that the remediation engine identifies the plurality of commands associated with a same cloud-based application as is associated with the identified security vulnerability. In some implementations, the plurality of commands may be associated with the security vulnerability indicator that corresponds to the identified security vulnerability. Accordingly, the plurality of commands may include commands that were manually entered when the identified security vulnerability was resolved. Additionally, or alternatively, the plurality of commands may be associated with other security vulnerabilities (e.g., one or more others of the security vulnerabilities) that are determined to be similar to the identified security vulnerability (e.g., by the machine learning model described above and in connection with FIGS. 3A-3B).

As a result, the remediation engine may generate a sequence of instructions, within the automated remediation script, corresponding to the plurality of commands. For example, the remediation engine may generate Bourne Again Shell (BASH) instructions, Python instructions, and/or other scriptable instructions that will trigger the same commands executed by the cloud environment according to the remediation information.

In some implementations, the remediation engine may additionally receive (e.g., from the cloud environments and/or the vulnerability databases) validation information associated with the security vulnerability indicators. For example, the validation information may include test results from previous remediations of security vulnerabilities associated with the security vulnerability indicators. The validation information may be included in, or separate from, the historical information. Accordingly, the remediation engine may identify the plurality of commands based at least in part on the validation information. For example, the remediation engine may exclude commands that were manually entered in an attempt to resolve the identified security vulnerability but that did not help to resolve the security vulnerability according to the validation information (e.g., validation failed after the excluded commands). Additionally, or alternatively, the remediation engine may exclude commands that are not associated with other security vulnerabilities that are associated with validation information that is determined to be similar to validation information associated with the identified security vulnerability (e.g., by a machine learning model as described in connection with FIGS. 3A-3B).

As shown by reference number 230, the remediation engine may store the generated automated remediation script (e.g., in a memory associated with the remediation engine, in a separate storage device, or in a cloud-based storage associated with the cloud environments, among other examples).

Accordingly, the automated remediation script is ready when the remediation engine receives a new security vulnerability indicator, as shown in FIG. 2C and by reference number 235. For example, the automated remediation script may identify the new security vulnerability indicator as associated with a security vulnerability that was previously identified as high priority (e.g., by classifying the new security vulnerability indicator similarly as described in connection with FIGS. 1A-1C). Accordingly, as shown by reference number 240, the remediation engine may receive the automated remediation script from storage. For example, the automated remediation script may be stored with a unique identifier of a class of security vulnerabilities (e.g., as described in connection with FIGS. 1A-1C) such that, after the remediation engine clusters the new security vulnerability indicator with the same unique identifier, the remediation engine may obtain the corresponding automated remediation script.

As shown by reference number 245, the remediation engine may execute the script. For example, the remediation engine may execute the script as described in connection with FIG. 1B. Accordingly, as shown by reference number 250, the automated remediation script may instruct a cloud environment to perform an action for a cloud-based application associated with the new security vulnerability indicator. For example, the automated remediation script may trigger a patch and/or other software update to the cloud-based application. In some aspects, the remediation engine may execute the script in response to input associated with a message corresponding to the new security vulnerability indicator (e.g., as described in connection with FIGS. 1A-1B).

In some implementations, similarly as described in connection with FIG. 1C, the remediation engine may further receive validation information based on executing the script. For example, the remediation engine may determine that the generated automated remediation script resolved the security vulnerability associated with the new security vulnerability indicator. Accordingly, the remediation engine may automate resolution of new security vulnerabilities faster and more accurately than existing systems by applying machine learning.

By using techniques as described above, the remediation engine can apply a machine learning model to identify vulnerabilities associated with complicated remediations. For example, the model may use the historical information to identify vulnerabilities likely to cause downtime for large quantities of users and/or a large amount of time, among other examples. Additionally, the remediation engine can apply machine learning to determine an automated remediation for the identified vulnerabilities. Accordingly, the remediation engine increases speed and efficiency of remediation procedures, resulting in more secure cloud environments.

As indicated above, FIGS. 2A-2C are provided as examples. Other examples may differ from what is described with regard to FIGS. 2A-2C.

Figure 3A:
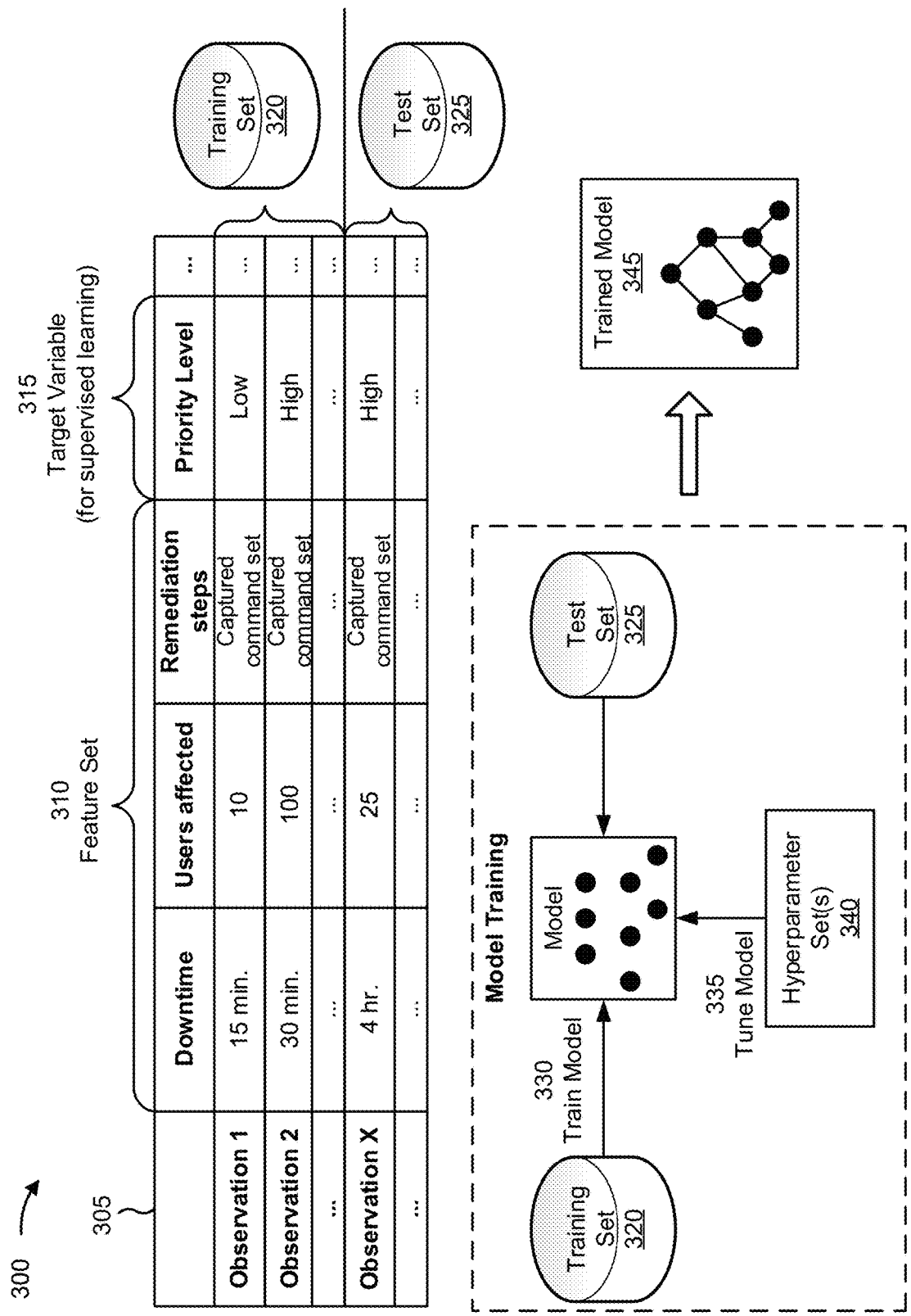
FIGS. 3A-3B are diagrams of an example implementation relating to training and applying a machine learning model.
Figure 3B:
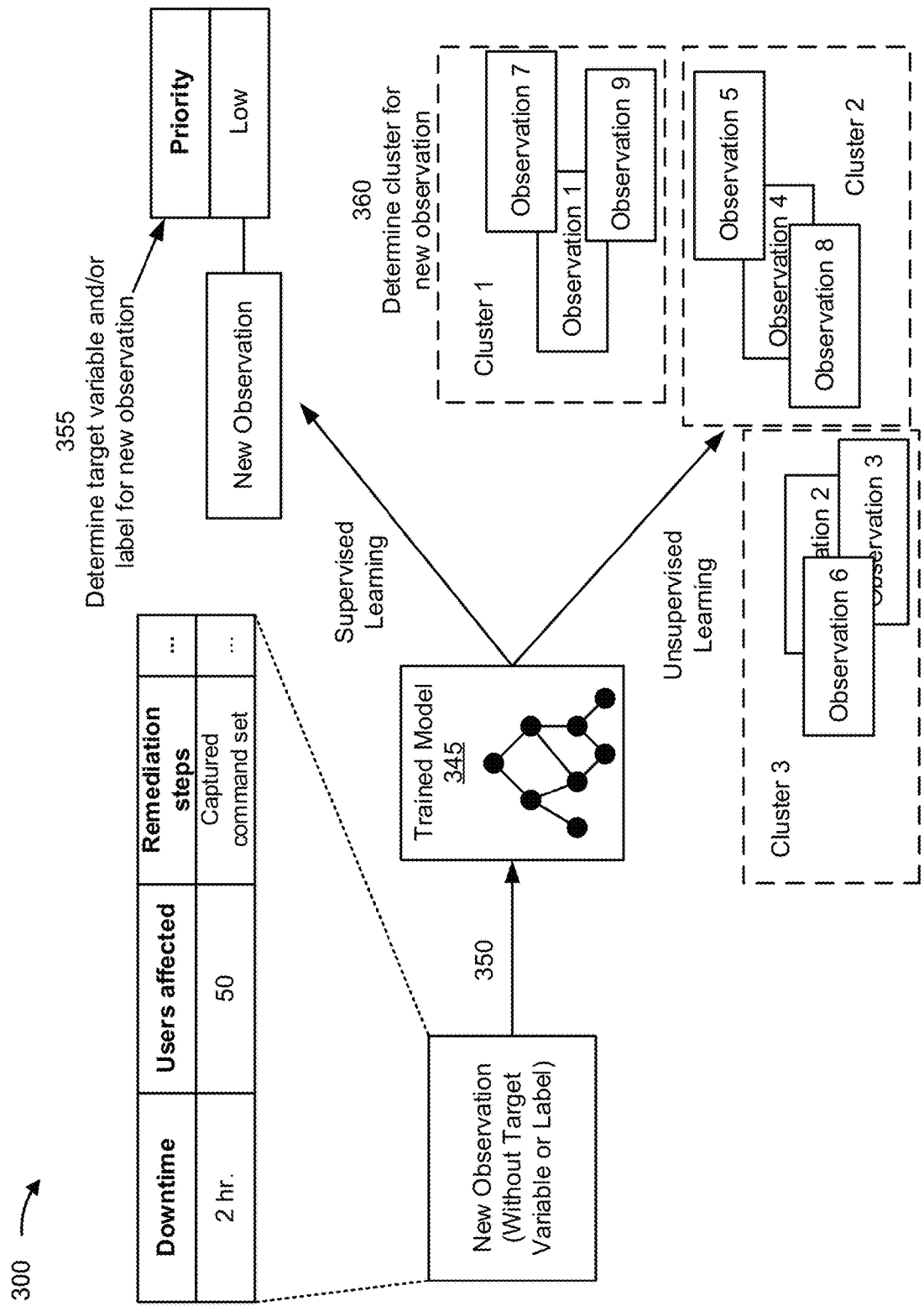

FIGS. 3A and 3B are diagrams illustrating an example 300 of training and applying a machine learning model in connection with remediating security vulnerabilities. The machine learning model training described herein may be performed using a machine learning system. The machine learning system may include or may be included in a computing device, a server, a cloud computing environment, or the like, such as the remediation engine described in more detail below.

As shown by reference number 305, a machine learning model may be trained using a set of observations. The set of observations may be obtained and/or input from training data (e.g., historical data), such as data gathered during one or more processes described herein. For example, the set of observations may include data gathered from vulnerability databases and/or cloud-based applications, as described elsewhere herein. In some implementations, the machine learning system may receive the set of observations (e.g., as input) from the databases and/or the applications.

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the databases and/or the applications. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of an amount of downtime, a second feature of a quantity of users affected, a third feature of a set of remediation steps performed, and so on. As shown, for a first observation, the first feature may have a value of 15 minutes, the second feature may have a value of 10 users, the third feature may include a series of steps (or commands) performed by users and captured by the remediation engine, and so on. These features and feature values are provided as examples, and may differ in other examples. For example, the feature set may include one or more of the following features: application identifiers, server identifiers, or user identifiers, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a priority level, which has a value of "low" for the first observation. For example, a security vulnerability associated with the first observation may be classified as "low" priority, assigned an integer score, decimal score, or another numerical priority score that is within a range categorized as "low," or assigned a letter grade or other non-numerical priority score that is within a range categorized as "low," among other examples.

The feature set and target variable described above are provided as examples, and other examples may differ from what is described above. For example, for a target variable of a security vulnerability class, the feature set may include application identifiers, server identifiers, or user identifiers, among other examples. In another example, the same feature set described above (optionally also including application identifiers, server identifiers, or user identifiers) may be used to determine a target variable of remediation steps. Accordingly, the machine learning model described herein may be used to determine a plurality of commands for remediating a vulnerability in addition to, or in lieu of, identifying a priority associated with the vulnerability.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k–1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of the data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 345.

FIG. 3B illustrates applying the trained machine learning model to a new observation associated with security vulnerabilities. The new observation may be input to a machine learning system that stores a trained machine learning model 345. The machine learning system may include or may be included in a computing device, a server, or a cloud computing environment, such as the remediation engine.

As shown by reference number 350, the machine learning system may receive a new observation (or a set of new observations), and may input the new observation to the machine learning model 345. As shown, the new observation may include a first feature of an amount of downtime, a second feature of a quantity of users affected, a third feature of a set of remediation steps performed, and so on, as an example. The machine learning system may apply the trained machine learning model 345 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 345 may predict a value of "low" for the target variable of priority for the new observation, as shown by reference number 355. Based on this prediction (e.g., based on the value having a particular label or classification or based on the value satisfying or failing to satisfy a threshold), the machine learning system may provide a recommendation and/or output for determination of a recommendation, such as not attempting to automate remediation of the vulnerability associated with the new observation. Additionally, or alternatively, the machine learning system may perform an automated action and/or may cause an automated action to be performed (e.g., by instructing another device to perform the automated action), such as moving the vulnerability to the end of a queue that includes vulnerabilities for future remediation automation. As another example, if the machine learning system were to predict a value of "high" for the target variable of priority, then the machine learning system may provide a different recommendation (e.g., recommending attempting to automate remediation of the vulnerability associated with the new observation) and/or may perform or cause performance of a different automated action (e.g., moving the vulnerability to the beginning of a queue that includes vulnerabilities for future remediation automation or performing automated generation of a script for remediation of the vulnerability). In some implementations, the recommendation and/or the automated action may be based on the target variable value having a particular label (e.g., classification or categorization) and/or may be based on whether the target variable value satisfies one or more thresholds (e.g., whether the target variable value is greater than a threshold, is less than a threshold, is equal to a threshold, or falls within a range of threshold values).

In some implementations, the trained machine learning model 345 may classify (e.g., cluster) the new observation in a cluster, as shown by reference number 360. The observations within a cluster may have a threshold degree of similarity. As an example, if the machine learning system classifies the new observation in a first cluster (e.g., associated with quantities of users affected that all satisfy a user quantity threshold, and/or associated with amounts of downtime that all satisfy a downtime threshold), then the machine learning system may provide a first recommendation, such as attempting to automate remediation of the vulnerability associated with the new observation. Additionally, or alternatively, the machine learning system may perform a first automated action and/or may cause a first automated action to be performed (e.g., by instructing another device to perform the automated action) based on classifying the new observation in the first cluster, such as performing automated generation of a script for remediation of the vulnerability. As another example, if the machine learning system were to classify the new observation in a second cluster (e.g., associated with quantities of users affected that all satisfy a user quantity threshold but are not associated with amounts of downtime that satisfy a downtime threshold, or associated with amounts of downtime that all satisfy a downtime threshold but are not associated with quantities of users affected that satisfy a user quantity threshold), then the machine learning system may provide a second (e.g., different) recommendation (e.g., possibly attempting to automate remediation of the vulnerability associated with the new observation) and/or may perform or cause performance of a second (e.g., different) automated action, such as moving the vulnerability to the middle of a queue that includes vulnerabilities for future remediation automation. As another example, if the machine learning system were to classify the new observation in a third cluster (e.g., associated with quantities of users affected that do not satisfy a user quantity threshold and are associated with amounts of downtime that do not satisfy a downtime threshold), then the machine learning system may provide a second (e.g., different) recommendation (e.g., not attempting to automate remediation of the vulnerability associated with the new observation) and/or may perform or cause performance of a second (e.g., different) automated action, such as moving the vulnerability to the back of a queue that includes vulnerabilities for future remediation automation.

The recommendations, actions, and clusters described above are provided as examples, and other examples may differ from what is described above. For example, the recommendations associated with new observations may include remediation recommendations. The actions associated with new observations may include, for example, generating automated remediation scripts for vulnerabilities associated with the new observations.

In this way, the machine learning system may apply a rigorous and automated process for classifying security vulnerabilities. The machine learning system enables recognition and/or identification of tens, hundreds, thousands, or millions of features and/or feature values for tens, hundreds, thousands, or millions of observations, thereby increasing accuracy and consistency and reducing delay associated with prioritizing vulnerabilities for automated remediation relative to requiring computing resources to be allocated for tens, hundreds, or thousands of operators to manually prioritize vulnerabilities using the features or feature values. Additionally, as described above, the machine learning system may apply a rigorous and automated process for generating scripts to automatically remediate vulnerabilities. The machine learning system enables recognition and/or identification of tens, hundreds, thousands, or millions of features and/or feature values for tens, hundreds, thousands, or millions of observations, thereby increasing accuracy and consistency and reducing delay associated with generating the scripts relative to requiring computing resources to be allocated for tens, hundreds, or thousands of operators to manually generating scripts using the features or feature values.

As indicated above, FIGS. 3A-3B are provided as an example. Other examples may differ from what is described in connection with FIGS. 3A-3B. For example, the machine learning model may be trained using a different process than what is described in connection with FIG. 3A. Additionally, or alternatively, the machine learning model may employ a different machine learning algorithm than what is described in connection with FIGS. 3A-3B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 4:
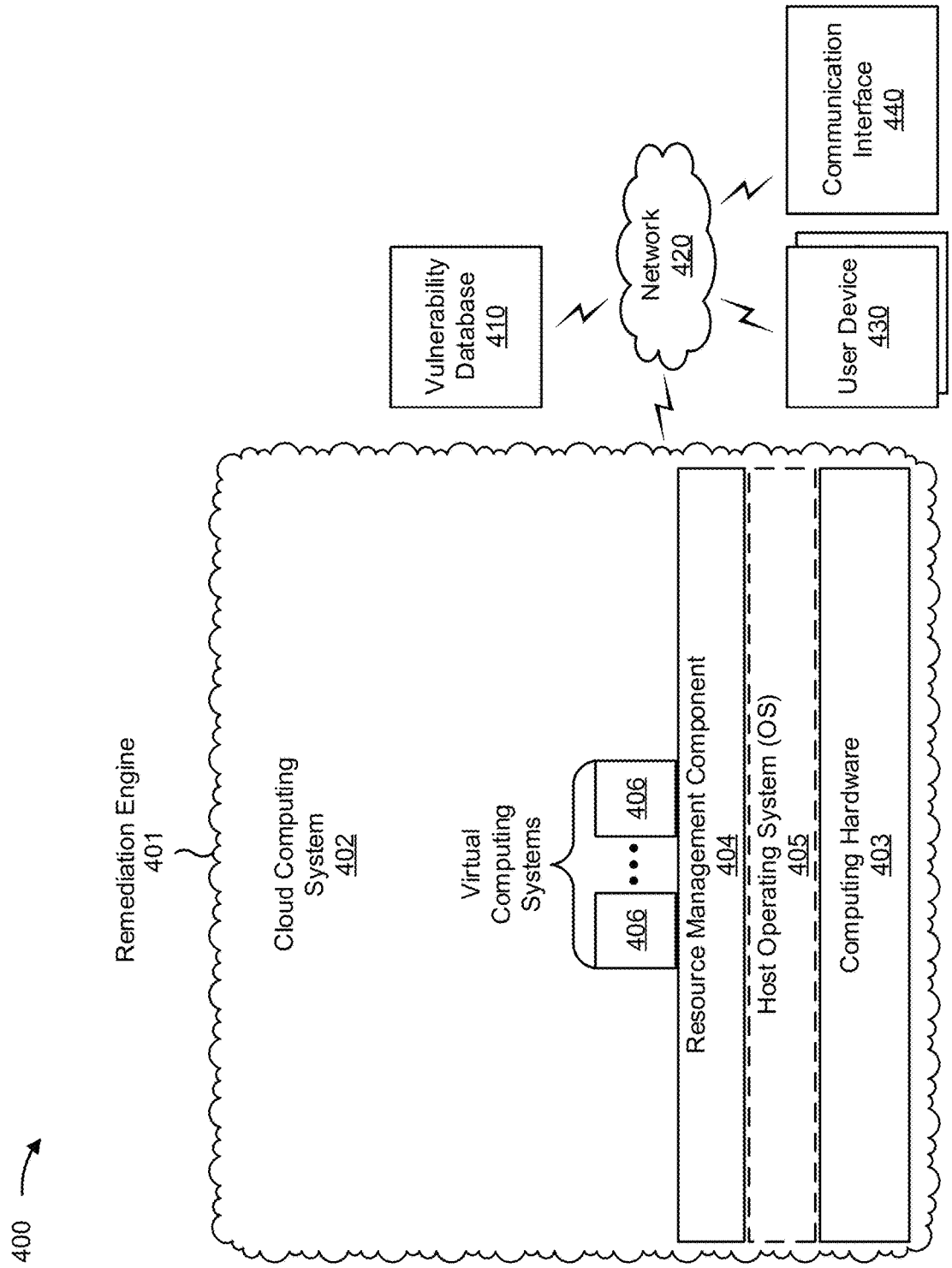
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a remediation engine 401, which may include one or more elements of and/or may execute within a cloud computing system 402. The cloud computing system 402 may include one or more elements 403-406, as described in more detail below. As further shown in FIG. 4, environment 400 may include a vulnerability database 410, a network 420, a user device 430, and/or a communication interface 440.

Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. Computer hardware 403 may include one or more processors, one or more memories, one or more storage components, and/or one or more networking components, examples of which are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines. Additionally, or alternatively, the resource management component 404 may include a container manager, such as when the virtual computing systems 406 are containers. In some implementations, the resource management component 404 executes within and/or in coordination with a host operating system 405.

A virtual computing system 406 includes a virtual environment that enables cloud-based execution of operations and/or processes described herein using computing hardware 403. A virtual computing system 406 may execute one or more applications using a file system that includes binary files, software libraries, and/or other resources required to execute applications on a guest operating system (e.g., within the virtual computing system 406) or the host operating system 405.

Although the remediation engine 401 may include one or more elements 403-406 of the cloud computing system 402, may execute within the cloud computing system 402, and/or may be hosted within the cloud computing system 402, in some implementations, the remediation engine 401 may not be cloud-based (e.g., may be implemented outside of a cloud computing system) or may be partially cloud-based. For example, the remediation engine 401 may include one or more devices that are not part of the cloud computing system 402, such as device 500 of FIG. 5, which may include a standalone server or another type of computing device. The remediation engine 401 may perform one or more operations and/or processes described in more detail elsewhere herein.

Vulnerability database 410 may be implemented on a cloud computing system at least partially integrated with cloud computing system 402 (e.g., as computing hardware 403) or distinct from cloud computing system 402 (e.g., as a standalone server). In some implementations, the vulnerability database 410 may include one or more devices (e.g., one or more servers) that are not part of a cloud computing system, such as device 500 of FIG. 5, which may include a standalone server or another type of computing device. The vulnerability database 410 may store information regarding security vulnerabilities, as described elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

User device 430 may include one or more devices capable of receiving messages regarding security vulnerability indicators. The user device 430 may include a communication device. For example, the user device 450 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 430 may communicate with the remediation engine 401 based on interaction with the messages, as described elsewhere herein.

Communication interface 440 may be implemented on a cloud computing system at least partially integrated with cloud computing system 402 (e.g., as computing hardware 403) or distinct from cloud computing system 402 (e.g., as a standalone server). In some implementations, the communication interface 440 may include one or more devices (e.g., one or more servers) that are not part of a cloud computing system, such as device 500 of FIG. 5, which may include a standalone server or another type of computing device. The communication interface 440 may deliver messages regarding security vulnerability indicators, to user devices, based on instructions from the remediation engine 401, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
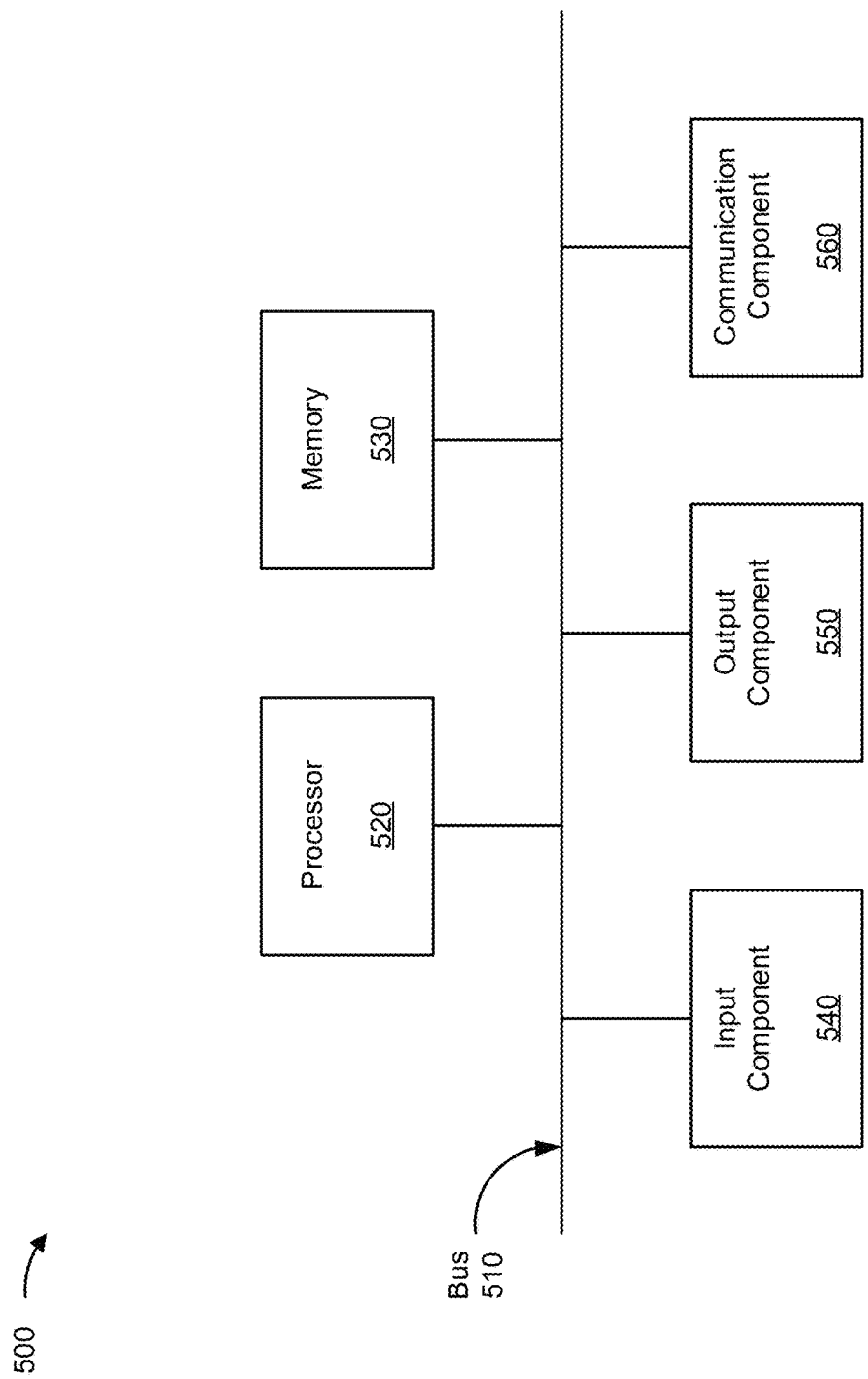
FIG. 5 is a diagram of example components of one or more devices of FIG. 4.

FIG. 5 is a diagram of example components of a device 500, which may correspond to a vulnerability database, a communication interface, and/or a user device. In some implementations, a vulnerability database, a communication interface, and/or a user device may include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
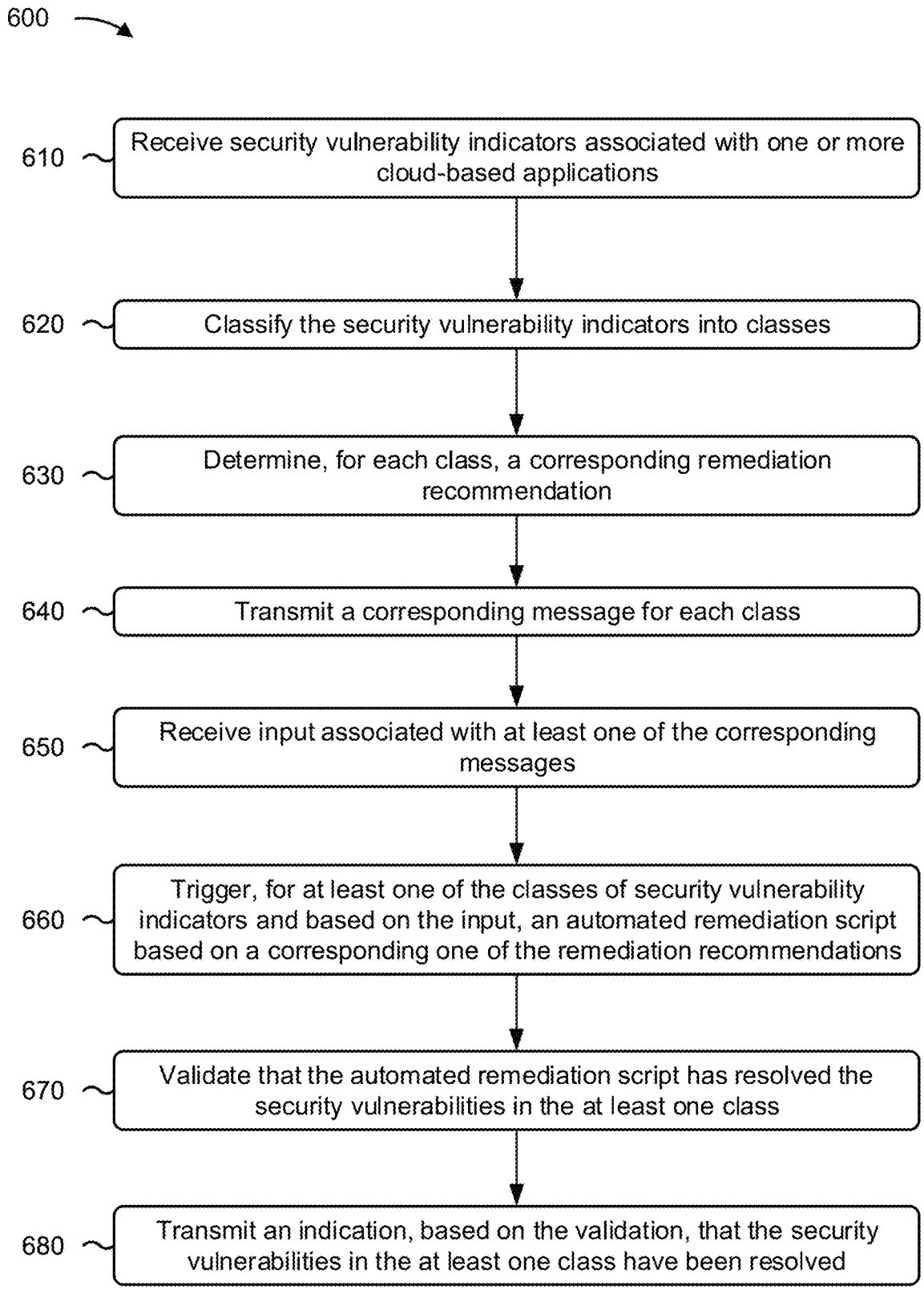
FIG. 6 is a flowchart of an example process relating to automated communications and remediation for security vulnerabilities.

FIG. 6 is a flowchart of an example process 600 associated with automated communications and remediation for security vulnerabilities. In some implementations, one or more process blocks of FIG. 6 may be performed by a system (e.g., remediation engine 401). In some implementations, one or more process blocks of FIG. 6 may be performed by another device or a group of devices separate from or including the system, such as a vulnerability database 410, user device 430, and/or communication interface 440. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving security vulnerability indicators associated with one or more cloud-based applications (block 610). For example, the system may receive the indicators from a database that stores information regarding security vulnerabilities. As further shown in FIG. 6, process 600 may include clustering the security vulnerability indicators into classes (block 620). The system may cluster the indicators using at least one similarity between two or more of the security vulnerabilities. As further shown in FIG. 6, process 600 may include determining, for each class, a corresponding remediation recommendation (block 630). As further shown in FIG. 6, process 600 may include transmitting a corresponding message for each class (block 640). The system may transmit the corresponding messages based on a setting and via one or more communication interfaces. As further shown in FIG. 6, process 600 may include receiving input associated with at least one of the corresponding messages (block 650). As further shown in FIG. 6, process 600 may include triggering, for at least one of the classes of security vulnerability indicators and based on the input, an automated remediation script based on a corresponding one of the remediation recommendations (block 660). The automated remediation script causes a cloud environment to perform an action for a cloud-based application associated with the security vulnerability indicators in the at least one of the classes. As further shown in FIG. 6, process 600 may include validating that the automated remediation script has resolved the security vulnerabilities associated with the security vulnerability indicators in the at least one of the classes (block 670). As further shown in FIG. 6, process 600 may include transmitting an indication, based on the validation, that the security vulnerabilities, associated with the security vulnerability indicators in the at least one of the classes, have been resolved (block 680).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
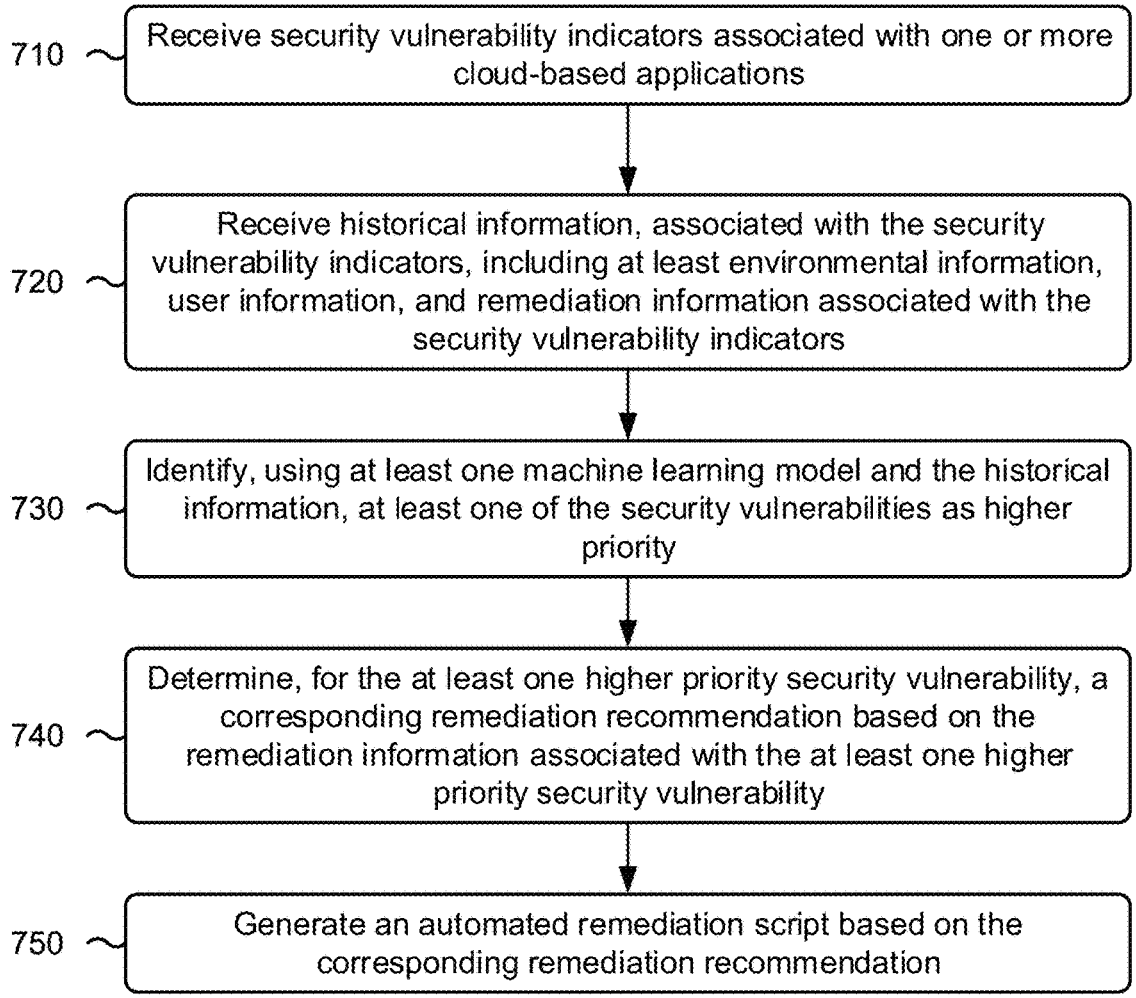
FIG. 7 is a flowchart of an example process relating to applying machine learning to automated communications and remediation for security vulnerabilities.

FIG. 7 is a flowchart of an example process 700 associated with security vulnerability communication and remediation with machine learning. In some implementations, one or more process blocks of FIG. 7 may be performed by a device (e.g., remediation engine 401). In some implementations, one or more process blocks of FIG. 7 may be performed by another device or a group of devices separate from or including the system, such as a vulnerability database 410, user device 430, and/or communication interface 440. Additionally, or alternatively, one or more process blocks of FIG. 7 may be performed by one or more components of device 500, such as processor 520, memory 530, input component 540, output component 550, and/or communication component 560.

As shown in FIG. 7, process 700 may include receiving security vulnerability indicators associated with one or more cloud-based applications (block 710). For example, the system may receive the indicators from a database that stores information regarding security vulnerabilities. As further shown in FIG. 7, process 700 may include receiving historical information associated with the security vulnerability indicators (block 720). The historical information may include at least environmental information, user information, and remediation information associated with the security vulnerability indicators. As further shown in FIG. 7, process 700 may include identifying at least one of the security vulnerabilities (block 730). For the identifying, the system may use at least one machine learning model and the historical information. As further shown in FIG. 7, process 700 may include determining, for the at least one of the security vulnerabilities, a corresponding remediation recommendation based on the remediation information associated with the at least one of the security vulnerabilities (block 740). As further shown in FIG. 7, process 700 may include generating an automated remediation script based on the corresponding remediation recommendation (block 750).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automated communications and remediation for security vulnerabilities, the system comprising: one or more memories; and one or more processors, communicatively coupled to the one or more memories, configured to:
   receive, from a database that stores information regarding security vulnerabilities, security vulnerability indicators associated with one or more cloud-based applications;
   cluster the security vulnerability indicators into classes, each associated with a particular hardware server, based on whether the security vulnerabilities are on a same hardware server, and further determine that at least one of the security vulnerability indicators is associated with a dependency chain corresponding to a forthcoming update of another application,
   wherein a vulnerability, corresponding to the at least one of the security vulnerability indicators, is associated with being resolved by the forthcoming update to the other application; and
   exclude the at least one of the security vulnerability indicators from classification based on the determination;
   determine, for each class of the classes and based on applying a machine learning model to at least a portion of historical information associated with the security vulnerability indicators, a corresponding remediation recommendation,
   wherein the machine learning model is trained to determine the corresponding remediation recommendation based on other security vulnerabilities, of the security vulnerabilities, that are associated with the same cloud environment or the same hardware server;
   determine, based on stored settings associated with users of the one or more cloud-based applications, one or more communication interfaces,
   wherein a stored setting associated with a user of the users indicates a communication interface for communications related to the security vulnerability indicators;
   transmit, via the one or more communication interfaces, a corresponding message for each class of the classes;
   receive input associated with at least one of the corresponding messages;

trigger, for at least one of the classes of security vulnerability indicators and based on the input, an automated remediation script based on a corresponding one of the remediation recommendations,
wherein the automated remediation script causes a cloud environment to perform an action for one of the cloud-based applications associated with the security vulnerability indicators in the at least one of the classes;
validate that the automated remediation script has resolved the security vulnerabilities associated with the security vulnerability indicators in the at least one of the classes; and
transmit an indication, based on the validation and via the one or more communication interfaces, that the security vulnerabilities, associated with the security vulnerability indicators in the at least one of the classes, have been resolved.

2. The system of claim 1, wherein the corresponding messages do not indicate the at least one excluded security vulnerability indicator.

3. The system of claim 1, wherein the one or more processors, to cluster the security vulnerability indicators, are configured to:
apply a plurality of regular expressions to one or more fields included in the security vulnerability indicators.

4. The system of claim 1, wherein the classes are associated with corresponding unique identifiers, and wherein the one or more processors, to cluster the security vulnerability indicators, are configured to:
map corresponding identifiers associated with the security vulnerability indicators to the corresponding unique identifiers associated with the classes.

5. The system of claim 1, wherein the security vulnerabilities are associated with one or more corresponding servers, and wherein the one or more processors, to cluster the security vulnerability indicators, are configured to:
group the security vulnerability indicators according to, at least in part, the one or more corresponding servers.

6. A method of applying machine learning to automated communications and remediation for security vulnerabilities, comprising: receiving, from a database that stores information regarding security vulnerabilities, security vulnerability indicators associated with one or more cloud-based applications;
clustering, using at least one machine learning model, the security vulnerability indicators into classes, each associated with a particular hardware server, based on whether the security vulnerabilities are on a same hardware server, and further determining that at least one of the security vulnerability indicators is associated with a dependency chain corresponding to a forthcoming update of another application,
wherein a vulnerability, corresponding to the at least one of the security vulnerability indicators, is associated with being resolved by the forthcoming update to the other application; and
excluding the at least one of the security vulnerability indicators from classification based on the determination;
determining, for each class of the classes and based on applying the at least one machine learning model to at least a portion of historical information, a corresponding remediation recommendation,
wherein the at least one machine learning model is trained to determine the corresponding remediation recommendation based on other security vulnerabilities that are associated with a same hardware server;
determining, based on stored settings associated with users of the one or more cloud-based applications, one or more communication interfaces,
wherein a stored setting associated with a user of the users indicates a communication interface for communications related to the security vulnerability indicators;
transmitting, via the one or more communication interfaces, a corresponding message for each class of the classes;
receiving input associated with at least one of the corresponding messages; and
triggering, for at least one of the classes of security vulnerability indicators and based on the input, an automated remediation script based on a corresponding one of the remediation recommendations,
wherein the automated remediation script causes a cloud environment to perform an action for a cloud-based application associated with the security vulnerability indicators in the at least one of the classes.

7. The method of claim 6, wherein the one or more cloud-based applications include at least one application that controls, at least in part, a networked hardware device.

8. The method of claim 6, wherein the at least one machine learning model uses at least server indications associated with the security vulnerability indicators and application indications associated with the security vulnerability indicators to cluster the security vulnerability indicators.

9. The method of claim 6, wherein the input comprises selection of a hyperlink included in the at least one of the corresponding messages.

10. The method of claim 6, further comprising:
receiving, with the input, at least one credential associated with at least one recipient of the at least one of the corresponding messages,
wherein the automated remediation script is triggered based on an authorization using the at least one credential.

11. The method of claim 6, further comprising:
validating that the automated remediation script has resolved the security vulnerability indicators in the at least one of the classes; and
transmitting an indication, based on the validation, that the security vulnerability indicators in the at least one of the classes have been resolved.

12. A non-transitory computer-readable medium storing a set of instructions for applying machine learning to automated communications and remediation for security vulnerabilities, the set of instructions comprising: one or more instructions that, when executed by one or more processors of a device, cause the device to:
receive, from a database that stores information regarding security vulnerabilities, security vulnerability indicators associated with one or more cloud-based applications,
wherein the security vulnerability indicators are clustered into classes, each associated with a particular hardware server, based on whether the security vulnerabilities are on a same hardware server, and and further determine that at least one of the security vulnerability indicators is associated with a dependency chain corresponding to a forthcoming update of another application,
wherein a vulnerability, corresponding to the at least one of the security vulnerability indicators, is associated with being resolved by the forthcoming update to the other application; and exclude the at least one of the security vulnerability indicators from classification based on the determination;

receive historical information associated with the security vulnerability indicators, the historical information including at least environmental information, user information, and remediation information associated with the security vulnerability indicators;

train, based on observations related to quantities of affected users, a machine learning model to identify at least one of the security vulnerabilities as high priority, wherein the machine learning model is trained based on other security vulnerabilities, of the security vulnerabilities, that are associated with a same hardware server;

identify, using the machine learning model and the historical information, and based on determining that a quantity of affected users associated with the at least one of the security vulnerabilities satisfies a user quantity threshold, the at least one of the security vulnerabilities as high priority, wherein the quantity of affected users is provided as input to the machine learning model;

determine, for the at least one of the security vulnerabilities, a corresponding remediation recommendation based on the remediation information associated with the at least one of the security vulnerabilities; and generate an automated remediation script based on the corresponding remediation recommendation.

13. The non-transitory computer-readable medium of claim 12, wherein the one or more instructions, that cause the device to identify the at least one of the security vulnerabilities as high priority, cause the device to:

identify the at least one of the security vulnerabilities as high priority based on determining that an amount of remediation time associated with the at least one of the security vulnerabilities satisfies a time threshold.

14. The non-transitory computer-readable medium of claim 12, wherein the one or more instructions, that cause the device to determine the corresponding remediation recommendation, cause the device to perform one or more of:

determining the corresponding remediation recommendation based on one or more others, of the security vulnerabilities, that are associated with a same server as the at least one of the security vulnerabilities; or determining the corresponding remediation recommendation based on one or more others, of the security vulnerabilities, that are associated with a same application as the at least one of the security vulnerabilities.

15. The non-transitory computer-readable medium of claim 12, wherein the one or more instructions, that cause the device to generate the automated remediation script, cause the device to:

identify, within the remediation information associated with at least one of the security vulnerability indicators corresponding to the at least one of the security vulnerabilities, a plurality of commands provided to a cloud environment for a cloud-based application associated with the at least one of the security vulnerability indicators; and generate a sequence of instructions, within the automated remediation script, corresponding to the plurality of commands.

16. The non-transitory computer-readable medium of claim 15, wherein the one or more instructions, when executed by the one or more processors, further cause the device to:

receive validation information associated with the security vulnerability indicators, wherein the plurality of commands are identified using the validation information associated with the at least one of the security vulnerability indicators corresponding to the at least one of the security vulnerabilities.

17. The non-transitory computer-readable medium of claim 12, wherein the one or more instructions, when executed by the one or more processors, further cause the device to:

execute an automated remediation script; and receive validation information based on executing the automated remediation script.

* * * * *